(12) United States Patent
Kim et al.

(10) Patent No.: US 7,542,405 B2
(45) Date of Patent: Jun. 2, 2009

(54) HIGH-DENSITY OPTICAL DISC, METHOD FOR RECORDING AND REPRODUCING ENCRYPTED DATA THEREON

(75) Inventors: Jin Yong Kim, Kyunggi-do (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/907,747

(22) Filed: Oct. 17, 2007

(65) Prior Publication Data

US 2008/0095026 A1 Apr. 24, 2008

Related U.S. Application Data

(63) Continuation of application No. 10/516,911, filed as application No. PCT/KR03/01112 on Jun. 5, 2003.

(30) Foreign Application Priority Data

| Jun. 5, 2002 | (KR) | .................. 10-2002-0031744 |
| Jun. 5, 2002 | (KR) | .................. 10-2002-0031745 |
| Jun. 5, 2002 | (KR) | .................. 10-2002-0031746 |

(51) Int. Cl.
*G11B 7/24* (2006.01)
*G11B 5/09* (2006.01)

(52) U.S. Cl. ............... 369/275.3; 369/275.1; 369/47.48; 369/59.19

(58) Field of Classification Search .................. None
See application file for complete search history.

(56) References Cited

U.S. PATENT DOCUMENTS 4,419,750 A 12/1983 Howe
4,788,625 A 11/1988 Maijers
4,792,917 A 12/1988 Takamatsu et al.

(Continued)

FOREIGN PATENT DOCUMENTS

CN 1047179 11/1990

(Continued)

OTHER PUBLICATIONS

PCT Search Report dated Aug. 28, 2003.

(Continued)

*Primary Examiner*—Muhammad N. Edun
(74) *Attorney, Agent, or Firm*—Harness, Dickey & Pierce

(57) ABSTRACT

A high-density optical disc, a method for encrypting data and recording the encrypted data thereon, and a method for reproducing the encrypted data recorded thereon. Data recorded on a high-density optical disc such as a Blu-ray disc-read only memory (BD-ROM) is recorded in a discontinuous recording format as on a high-density rewritable optical disc such as a Blu-ray disc rewritable (BD-RE). Data can be encrypted and recorded using synchronous data, address unit number (AUN) information or disc radius information recorded in the high-density optical disc. An optical disc apparatus such as a BD-ROM player can maintain reproduction compatibility with the high-density rewritable optical disc such as the BD-RE. A user holding an optical disc apparatus such as a BD-RE recorder, etc. can be prevented from unlawfully copying data recorded on the high-density optical disc and reproducing the copied data.

24 Claims, 16 Drawing Sheets

U.S. PATENT DOCUMENTS

| | | | |
|---|---|---|---|
| 4,907,215 | A | 3/1990 | Sako et al. |
| 5,216,656 | A | 6/1993 | Sako et al. |
| 5,224,087 | A | 6/1993 | Maeda et al. |
| 5,313,340 | A | 5/1994 | Takayama et al. |
| 5,414,686 | A | 5/1995 | Iitsuka |
| 5,506,823 | A | 4/1996 | Sanada |
| 5,563,861 | A | 10/1996 | Kudo et al. |
| 5,570,339 | A | 10/1996 | Nagano |
| 5,587,978 | A | 12/1996 | Endo et al. |
| 5,644,507 | A | 7/1997 | Ostrover et al. |
| 5,650,991 | A | 7/1997 | Fujiie |
| 5,656,348 | A | 8/1997 | Kudo et al. |
| 5,708,649 | A | 1/1998 | Kamoto et al. |
| 5,729,516 | A | 3/1998 | Tozaki et al. |
| 5,886,985 | A | 3/1999 | Kobayashi et al. |
| 5,915,263 | A | 6/1999 | Maeda |
| 5,920,578 | A | 7/1999 | Zook |
| 5,940,255 | A | 8/1999 | Uwado et al. |
| 5,953,187 | A | 9/1999 | Uwado et al. |
| 6,115,340 | A | 9/2000 | Van Den Enden et al. |
| 6,122,245 | A | 9/2000 | Kondo et al. |
| 6,137,763 | A | 10/2000 | Dahan et al. |
| 6,157,606 | A | 12/2000 | Inazawa et al. |
| 6,182,240 | B1 | 1/2001 | Mine |
| 6,191,903 | B1 | 2/2001 | Fujimoto et al. |
| 6,205,104 | B1 | 3/2001 | Nagashima et al. |
| 6,330,392 | B1 | 12/2001 | Nakatani et al. |
| 6,343,062 | B1 | 1/2002 | Furukawa et al. |
| 6,392,968 | B1 | 5/2002 | Kageyama et al. |
| 6,442,128 | B1 | 8/2002 | Lee et al. |
| 6,477,123 | B1 | 11/2002 | Hütter |
| 6,628,584 | B1 | 9/2003 | Heemskerk et al. |
| 6,724,707 | B2 | 4/2004 | Woudenberg et al. |
| 6,735,155 | B2 | 5/2004 | Kuroda et al. |
| 6,762,984 | B1 | 7/2004 | Sasaki et al. |
| 6,788,609 | B2 | 9/2004 | Yamagami et al. |
| 6,788,630 | B1 | 9/2004 | Lee et al. |
| 6,879,637 | B1 | 4/2005 | Nakagawa et al. |
| 6,971,024 | B1 | 11/2005 | Sako et al. |
| 7,065,030 | B2 | 6/2006 | Tachino et al. |
| 2001/0026511 | A1 | 10/2001 | Ueda et al. |
| 2002/0027990 | A1 | 3/2002 | Sako et al. |
| 2002/0051631 | A1 | 5/2002 | Okamoto et al. |
| 2002/0064277 | A1 | 5/2002 | Kuribayashi et al. |
| 2002/0097648 | A1 | 7/2002 | Ilda |
| 2003/0012099 | A1 | 1/2003 | Sako et al. |
| 2004/0030983 | A1 | 2/2004 | Tomita |
| 2004/0165504 | A1 | 8/2004 | Kobayashi |
| 2005/0213483 | A1 | 9/2005 | Tomita et al. |
| 2006/0023601 | A1 | 2/2006 | Tachino et al. |
| 2006/0156205 | A1 | 7/2006 | Tomita |

FOREIGN PATENT DOCUMENTS

| | | |
|---|---|---|
| CN | 1054933 | 10/1991 |
| CN | 1135632 | 11/1996 |
| CN | 1140875 | 1/1997 |
| CN | 1340189 | 3/2002 |
| EP | 0 715 301 | 6/1996 |
| EP | 1 022 735 | 7/2000 |
| EP | 1 033 703 | 9/2000 |
| EP | 1 045 391 | 10/2000 |
| EP | 1 052 639 | 11/2000 |
| JP | 63-161569 | 7/1988 |
| JP | 05-040663 | 2/1993 |
| JP | 05-054518 | 3/1993 |
| JP | 05-314731 | 11/1993 |
| JP | 09-055731 | 2/1997 |
| JP | 09-073414 | 3/1997 |
| JP | 09-106549 | 4/1997 |
| JP | 09-106625 | 4/1997 |
| JP | 09-106625 A | 4/1997 |
| JP | 09-231567 | 9/1997 |
| JP | 11-045508 | 2/1999 |
| JP | 11-238305 | 8/1999 |
| JP | 11-238305 A | 8/1999 |
| JP | 11-296996 | 10/1999 |
| JP | 11-513167 | 11/1999 |
| JP | 2000-182219 | 3/2000 |
| JP | 12-113589 A | 4/2000 |
| JP | 2000-099952 | 4/2000 |
| JP | 2000-113589 | 4/2000 |
| JP | 2000-137952 | 5/2000 |
| JP | 2000-148569 | 5/2000 |
| JP | 12-195049 A | 7/2000 |
| JP | 2000-195049 | 7/2000 |
| JP | 2000-215607 | 8/2000 |
| JP | 2000-331412 | 11/2000 |
| JP | 2001-052338 | 2/2001 |
| JP | 2002-050136 | 2/2002 |
| JP | 2002-260339 | 9/2002 |
| JP | 2002-260341 | 9/2002 |
| JP | 2003-085892 | 3/2003 |
| KR | 10-2000-0015225 | 3/2000 |
| KR | 2000-15225 A | 3/2000 |
| KR | 10-0294881 | 4/2001 |
| KR | 10-2002-0039112 | 5/2002 |
| WO | WO 00/31737 | 6/2000 |
| WO | WO 01/15168 | 3/2001 |
| WO | WO 01/29832 | 4/2001 |
| WO | WO 01/48755 | 7/2001 |
| WO | WO 01/93262 | 12/2001 |

OTHER PUBLICATIONS

PCT Search Report dated Sep. 29, 2003.
Korean Search Report dated Jul. 30, 2004.
US Office Action dated Oct. 6, 2004.
European Search Report dated Dec. 28, 2004.
Korean Search Report dated Jan. 28, 2005.
Korean Search Report dated Mar. 28, 2005.
Chinese Office Action dated Sep. 30, 2005 and English translation.
US Office Action dated Nov. 2, 2005.
Chinese Office Action dated Feb. 10, 2006 and English translation.
Russian Search Report dated Feb. 22, 2006 and English translation.
US Office Action dated May 5, 2006.
US Office Action dated Sep. 7, 2006.
US Office Action dated Jan. 4, 2007.
Taiwan Search Report dated Apr. 16, 2007.
Taiwan Search Report dated Jun. 12, 2007.
US Office Action dated Jun. 13, 2007.
US Office Action dated Sep. 10, 2007.
US Office Action dated Sep. 28, 2007.
Chinese Office Action dated Sep. 21, 2007 and English translation.
US Office Action dated Nov. 16, 2007.
Japanese Search Report Mar. 18, 2008.
Office Action for corresponding Korean Application No. 10-2002-0031745 dated Jul. 31, 2008.
Office Action for corresponding Korean Application No. 10-2002-0031746 dated Jul. 31, 2008.
Office Action for corresponding Japanese Application No. 2005-184834 dated Sep. 16, 2008.
Search Report for corresponding International Application No. PCT/KR03/01109 dated Sep. 24, 2003.
Search Report for corresponding European Application No. 3757210.4 dated Sep. 23, 2005.
Office Action for corresponding Japanese Application No. 2004-512129 dated Nov. 14, 2006.
Office Action for corresponding Japanese Application No. 2004-512129 dated Jun. 12, 2007.
Office Action for corresponding Korean Application No. 10-2002-0031744 dated Jul. 31, 2008.

FIG. 1
Blu-ray Rewritable (100)
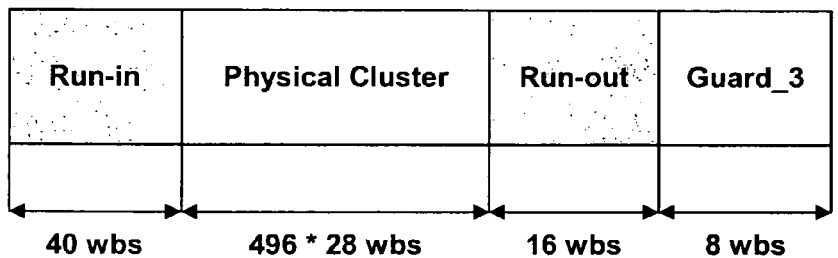
Single written Recording Unit Block
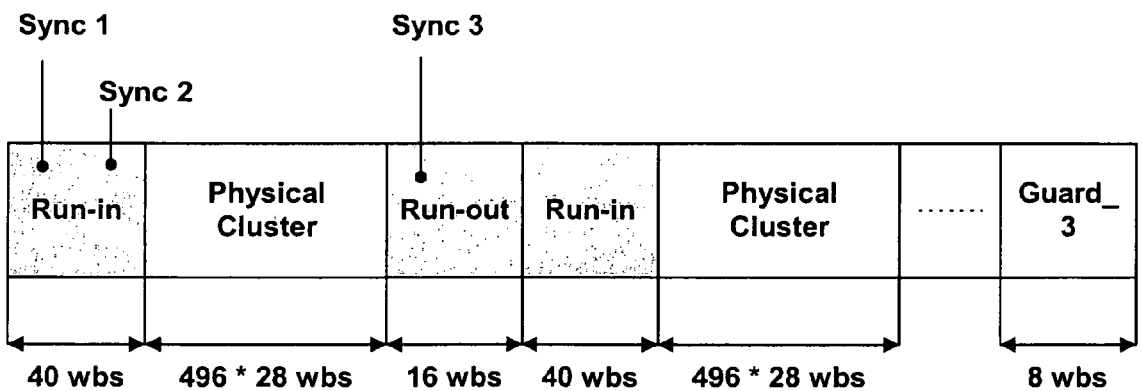
Continuously written sequence of Recording Unit Blocks Schematic representation of a Physical Cluster on the disc

HIGH-DENSITY OPTICAL DISC, METHOD FOR RECORDING AND REPRODUCING ENCRYPTED DATA THEREON

DOMESTIC PRIORITY INFORMATION

This is a continuation of, and claims priority under 35 U.S.C. §120 to, U.S. application Ser. No. 10/516,911, filed Aug. 22, 2005, which is the U.S. National Stage of International Application No. PCT/KRO3/01112, filed Jun. 5, 2003, the entire contents of all of which are hereby incorporated by reference in its entirety.

FOREIGN PRIORITY INFORMATION

The present invention claims priority under 35 U.S.C. 119 on Korean Application No. 10-2002-0031744, filed Jun. 5, 2002; Korean Application No. 10-2002-0031745, filed Jun. 5, 2002; and Korean Application No. 10-2002-0031746, filed Jun. 5, 2002; the contents of which are hereby incorporated by reference in their entirety.

1. TECHNICAL FIELD

The present invention relates to a high-density optical disc from which data can be reproduced, a method for encrypting data and recording the encrypted data thereon, and a method for reproducing the encrypted data recorded thereon.

2. BACKGROUND ART

Recently, large-capacity digital versatile discs (DVDs) capable of permanently storing high-quality video and audio in comparison with compact discs (CDs) have been developed, commercialized and supplied. Types of the DVDs include a DVD-read only memory (DVD-ROM), a write once DVD recordable (DVD-R), a DVD-random access memory (DVD-RAM) or DVD rewritable (DVD-RW), etc.

Standardization of a high-density rewritable optical disc, e.g., a Blu-ray disc rewritable (BD-RE), capable of recording high-density data, is ongoing. The BD-RE will be described in detail.

FIG. 1 shows recording unit blocks (RUBs) of a high-density rewritable optical disc, e.g., a Blu-ray disc rewritable (BD-RE). As shown in FIG. 1, a single RUB consisting of a run-in area, physical cluster area and run-out area or a sequence of RUBs consisting of run-in areas, physical cluster areas, run-out areas and the third guard area (Guard_3) located in a tail of the sequence of RUBs can be recorded in a BD-RE 100. In the sequence of the RUBs, each RUB consisting of the run-in area, the physical cluster area and the run-out area can be repeated twice or more.

As shown in FIG. 2, the run-in area includes the first guard area (Guard_1) and a preamble area (PrA). The preamble area includes the first synchronous data (Sync_1) and the second synchronous data (Sync_2). The first synchronous data and second synchronous data include 24-bit synchronous body data and a 6-bit synchronous ID, respectively.

The first and second synchronous data items are discriminated by different unique synchronous IDs. For example, the first synchronous data has a value of "000 100" as the synchronous ID. The second synchronous data has a value of "010 000" as the synchronous ID.

As shown in FIG. 3, the run-out area can include a post-amble area (PoA) and the second guard area (Guard_2). The post-amble area contains the third synchronous data (Sync_3). The third synchronous data includes 24-bit synchronous data and a 6-bit synchronous ID. The 6-bit synchronous ID of the third synchronous data is different from the 6-bit synchronous IDs of the first and second synchronous data. For example, the 6-bit synchronous ID of the third synchronous data has a value of "000 001".

The video and audio data recorded in the physical cluster area are read in synchronization with the synchronous data recorded in the run-in and run-out areas. Then, the video and audio data are reproduced as original video and audio signals through a reproduction signal processor such as a moving picture experts group (MPEG) decoder.

As shown in FIG. 4, the physical cluster area can contain a data stream associated with video data of moving pictures and audio data, frame synchronous information, a long distance error correction (LDC) code, a burst indicator sub-code (BIS) and an address unit (AU).

The LDC code and BIS are recorded on the basis of well-known Reed-Solomon code words for error correction. The AU is used for correctly searching for a position of recorded data. As shown in FIG. 5, the physical cluster area contains 16 AUs (AU 0-AU 15). An AU of 9 bytes includes address unit (AU) number information, flag bits, etc. The flag bits are reserved and set to "00h".

As shown in FIG. 6, the AU numbers are linked to physical sector numbers and also linked to physical address in pre-groove (ADIP) addresses. The AU number is useful as reference information in searching for the position of recorded data.

Thus, an optical disc apparatus such as a BD-RE recorder, etc. reads and confirms the physical sector numbers and physical ADIP addresses linked to the AU numbers. Then, the optical disc apparatus searches for a video and audio data stream recorded in the physical cluster area and then reads the searched data stream. Then, the optical disc apparatus performs an MPEG decoding operation to reproduce and output original video and audio signals.

Recently, it has been expected that the high-density optical disc, e.g. the BD-ROM, corresponding to the high-density rewritable optical disc will be developed. The high-density optical disc such as the BD-ROM must be able to maintain reproduction compatibility with a high-density rewritable optical disc such as a BD-RE on which data is recorded in a discontinuous recording format and must be able to prevent unauthorized or unlawful usage. However, there is not yet provided a method for effectively maintaining the above-described reproduction compatibility and preventing the unauthorized or unlawful usage.

3. DISCLOSURE OF INVENTION

Therefore, it is an object of the present invention to provide a high-density optical disc, a method for encrypting data and recording the encrypted data thereon, and a method for reproducing the encrypted data recorded thereon, which can maintain reproduction compatibility with a high-density rewritable optical disc such as a BD-RE on which data is recorded in a discontinuous recording format, can encrypt the data so that unauthorized or unlawful usage can be prevented, and can record and reproduce the encrypted data.

In accordance with one aspect of the present invention, the above and other objects can be accomplished by the provision of a high-density optical disc, wherein data is encrypted, and the encrypted data is recorded in the data recording area according to a discontinuous recording format.

In accordance with another aspect of the present invention, there is provided a high-density optical disc, wherein data is encrypted on the basis of synchronous data recorded in the data recording area, and the encrypted data is recorded in the data recording area according to a discontinuous recording format.

In accordance with another aspect of the present invention, there is provided a high-density optical disc, wherein data is encrypted on the basis of address unit number information recorded in the data recording area, and the encrypted data is recorded in the data recording area according to a discontinuous recording format.

In accordance with another aspect of the present invention, there is provided a high-density optical disc, wherein data is encrypted on the basis of disc radius information recorded in the data recording area, and the encrypted data is recorded in the data recording area according to a discontinuous recording format.

In accordance with another aspect of the present invention, there is provided a method for encrypting data and recording the encrypted data on a high-density optical disc, comprising the steps of: (a) encrypting data on the basis of synchronous data recorded on the high-density optical disc; and (b) recording the encrypted data in a discontinuous recording format.

In accordance with another aspect of the present invention, there is provided a method for encrypting data and recording the encrypted data on a high-density optical disc, comprising the steps of: (a) encrypting data on the basis of address unit number information recorded on the high-density optical disc; and (b) recording the encrypted data in a discontinuous recording format.

In accordance with another aspect of the present invention, there is provided a method for encrypting data and recording the encrypted data on a high-density optical disc, comprising the steps of: (a) encrypting data on the basis of disc radius information recorded on the high-density optical disc; and (b) recording the encrypted data in a discontinuous recording format.

In accordance with another aspect of the present invention, there is provided a method for reproducing encrypted data recorded on a high-density optical disc, comprising the steps of: (a) searching for and reading synchronous data recorded on the high-density optical disc; (b) decrypting encrypted data on the basis of the read synchronous data; and (c) decoding the decrypted data to original signal, and reproducing and processing the original signal.

In accordance with another aspect of the present invention, there is provided a method for reproducing encrypted data recorded on a high-density optical disc, comprising the steps of: (a) searching for and reading address unit number information recorded on the high-density optical disc; (b) decrypting encrypted data on the basis of the read address unit number information; and (c) decoding the decrypted data to original signal, and reproducing and processing the original signal.

In accordance with yet another aspect of the present invention, there is provided a method for reproducing encrypted data recorded on a high-density optical disc, comprising the steps of: (a) searching for and reading disc radius information recorded on the high-density optical disc; (b) decrypting encrypted data on the basis of the read disc radius information; and (c) decoding the decrypted data to original signal, and reproducing and processing the original signal.

4. BRIEF DESCRIPTION OF DRAWINGS

The accompanying drawings, which are included to provide a further understanding of the invention, illustrate the preferred embodiments of the invention, and together with the description, serve to explain the principles of the present invention.

FIG. 1 is a view illustrating recording unit blocks (RUBs) of a Blu-ray disc rewritable (BD-RE);

Features, elements, and aspects of the invention that are referenced by the same numerals in different figures represent the same, equivalent, or similar features, elements, or aspects in accordance with one or more embodiments.

5. MODES FOR CARRYING OUT THE INVENTION

A high-density optical disc, a method for encrypting data and recording the encrypted data thereon, and a method for reproducing the encrypted data recorded thereon in accordance with preferred embodiments of the present invention will be described in detail with reference to the annexed drawings.

First, as a Blu-ray disc rewritable (BD-RE) 100 in which video data of a moving picture and audio data are discontinuously recorded as shown in FIGS. 1 to 6, the high-density optical disc, e.g., a Blu-ray disc-read only memory (BD-ROM), can contain at least one RUB consisting of a run-in area, a physical cluster area, a run-out area and the third guard area (Guard_3). For reference, names of the above-described areas can be changed and designated by other names.

Figure 2:
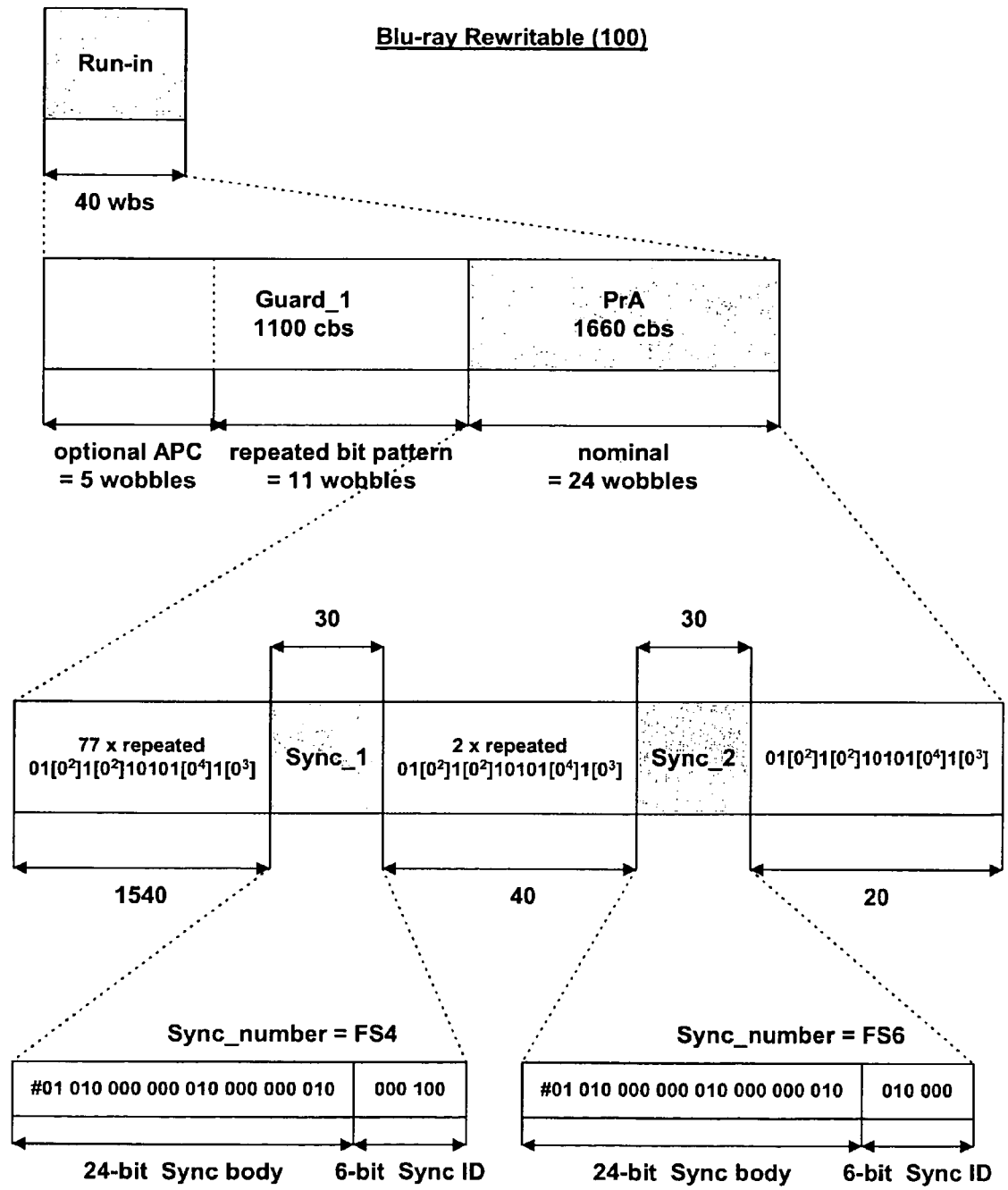
FIG. 2 is a view illustrating the configuration of a run-in area contained in an RUB of the BD-RE.
Figure 3:
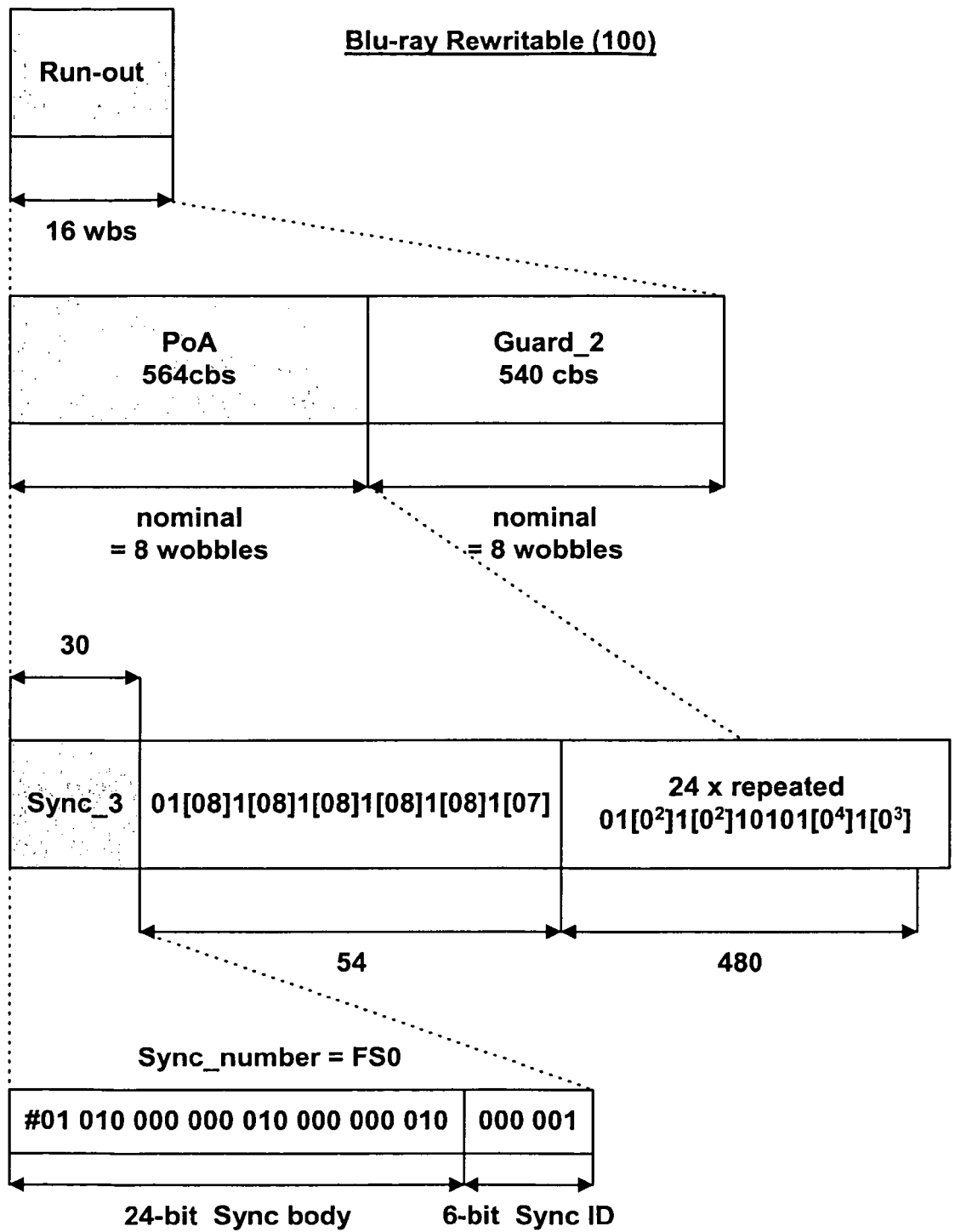
FIG. 3 is a view illustrating the configuration of a run-out area contained in the RUB of the BD-RE.
Figure 4:
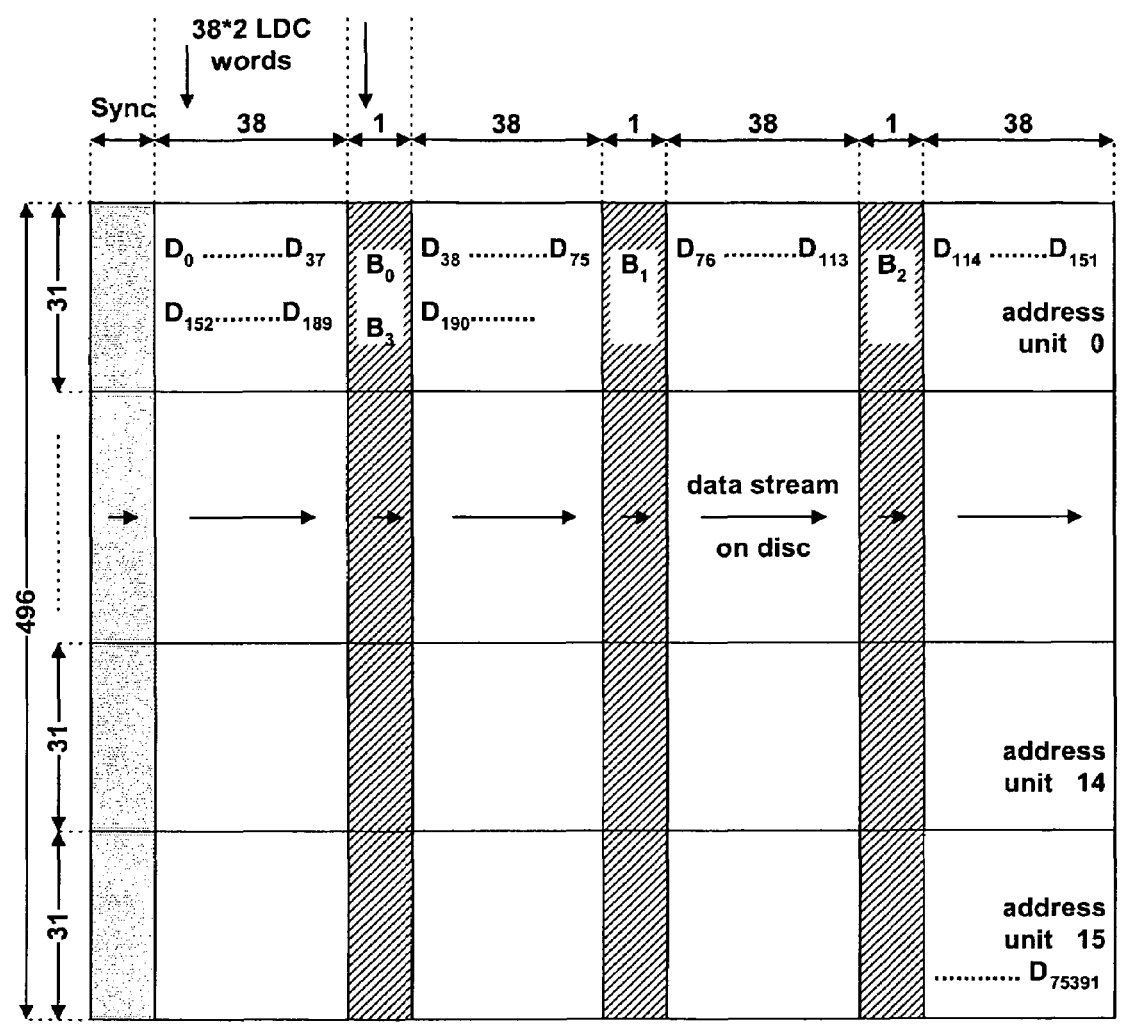
FIG. 4 is a view illustrating an address unit number (AUN) and data stream recorded in the physical cluster area.
Figure 5:
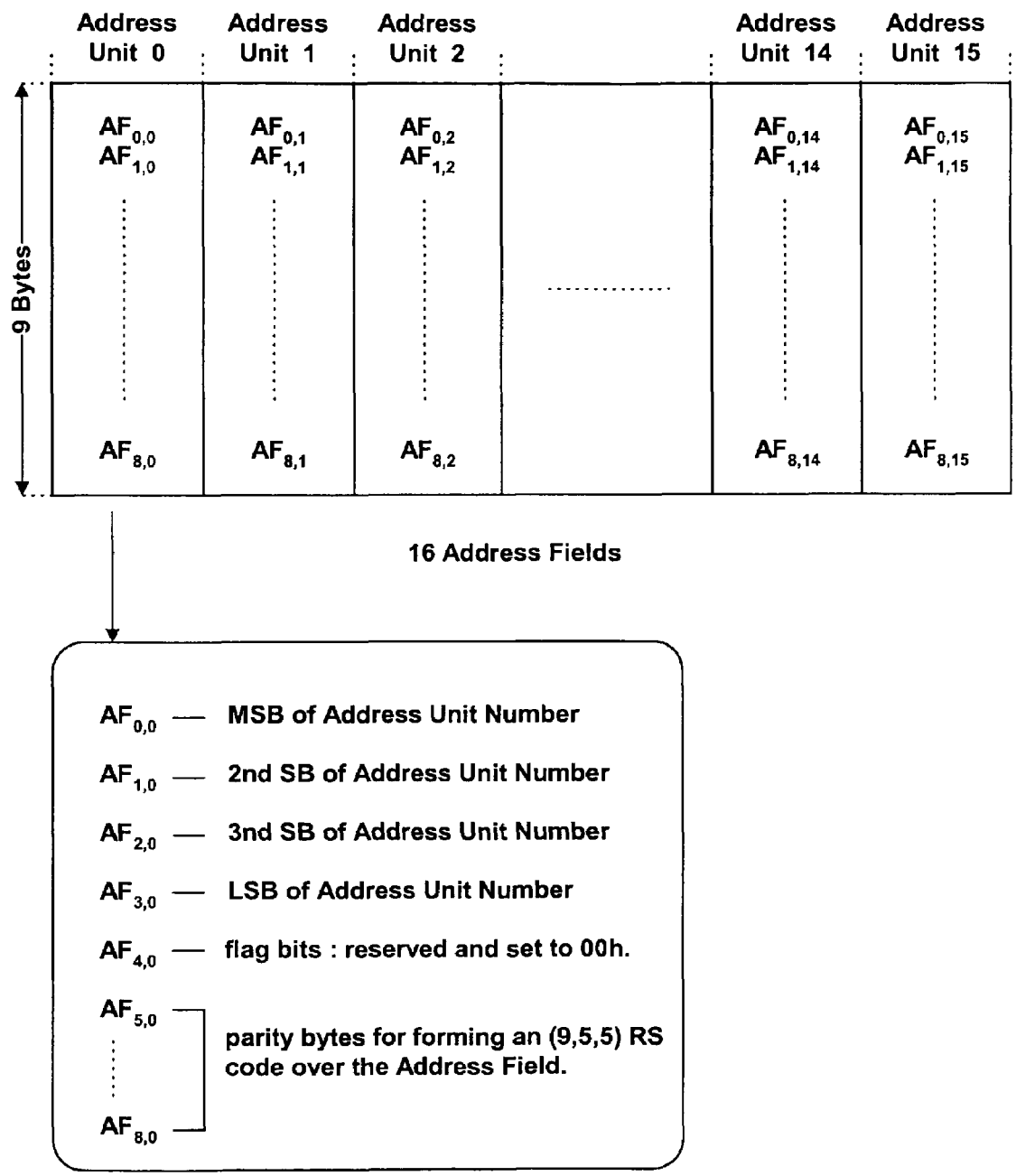
FIG. 5 is a view illustrating an address unit (AU) recorded in the physical cluster area of the BD-RE.
Figure 6:
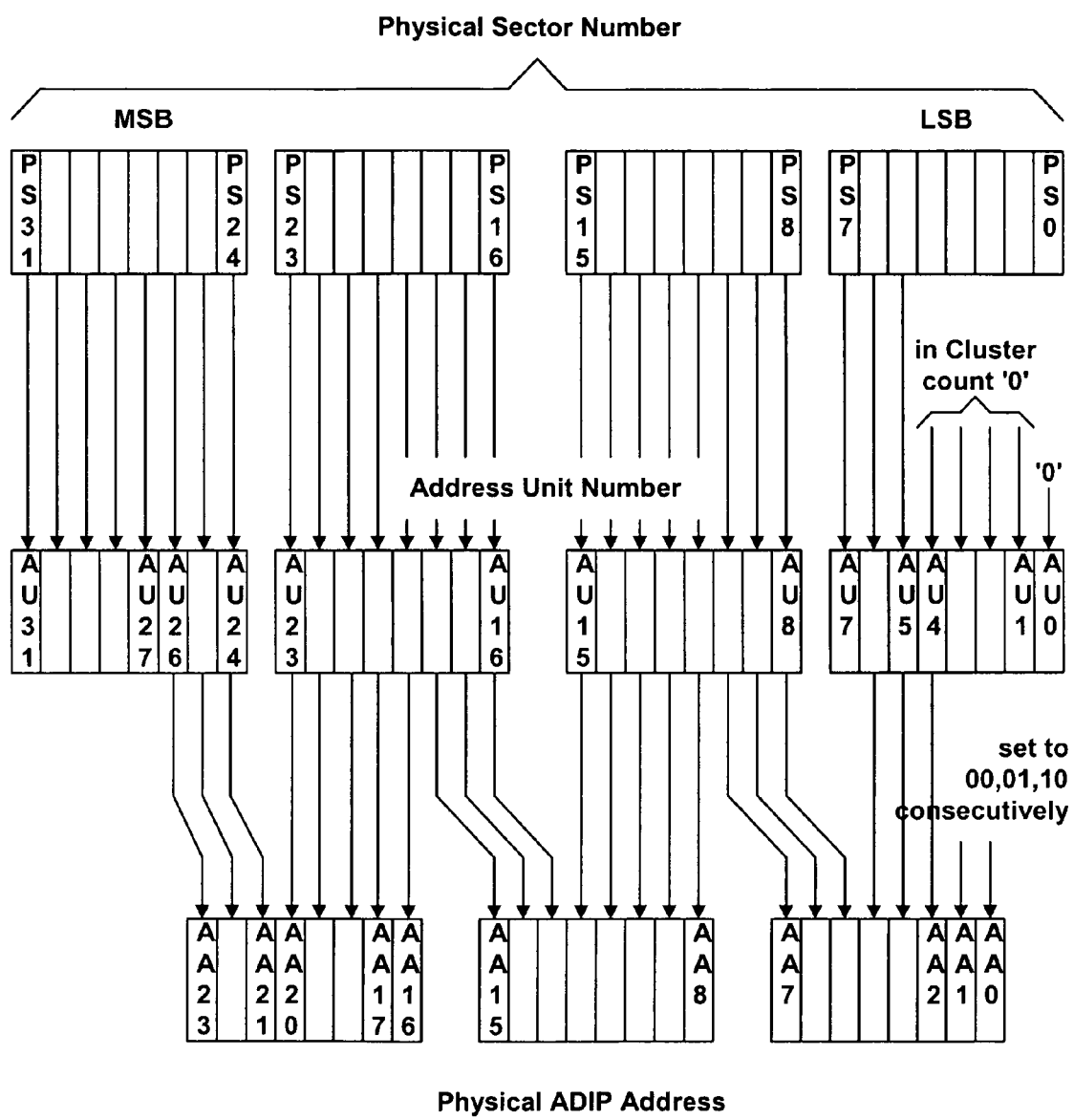
FIG. 6 is a view illustrating relations between a physical sector number, an address unit number and a physical address in pre-groove (ADIP) address associated with the BD-RE.
Figure 7:
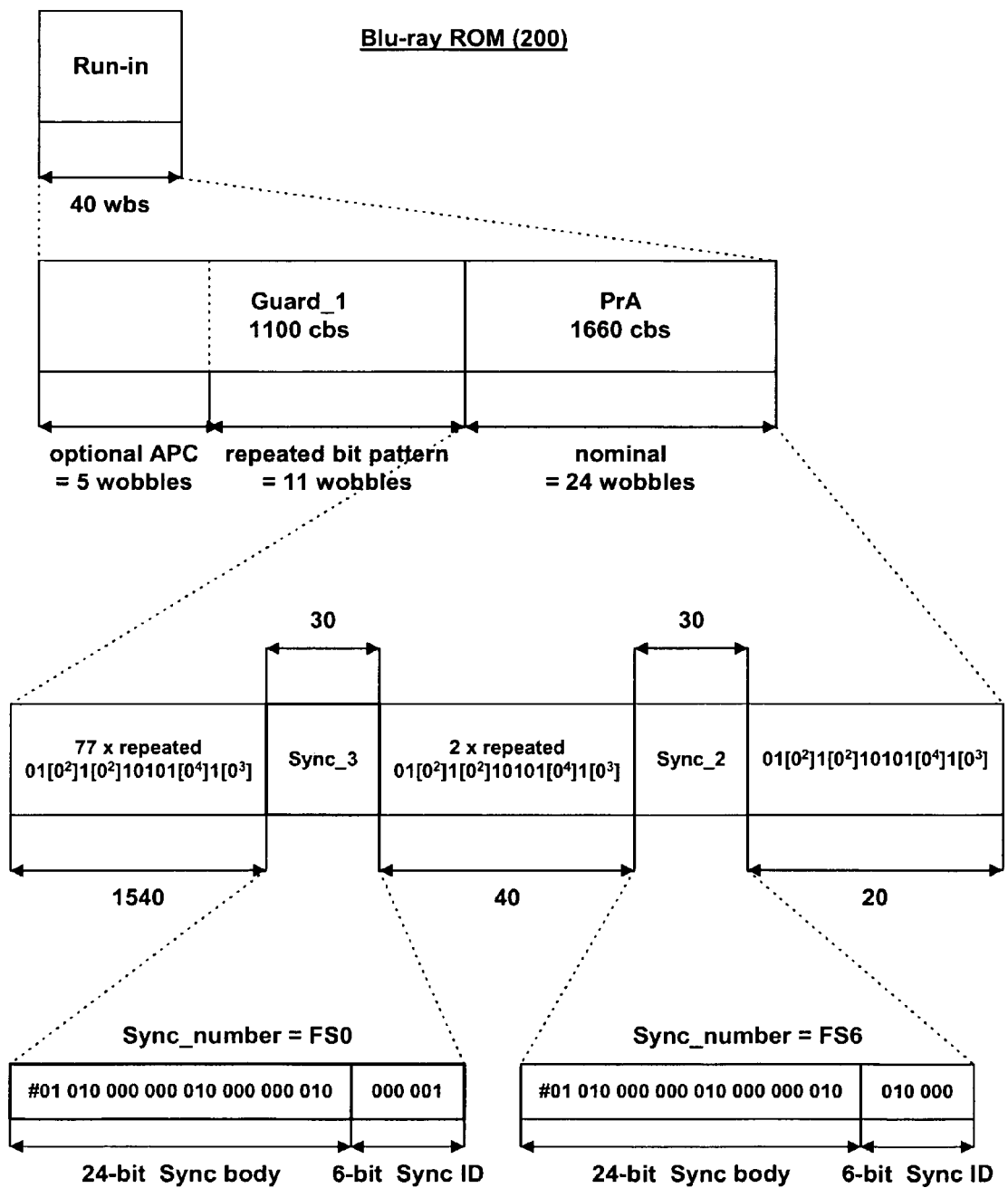
FIG. 7 is a view illustrating the configuration of a run-in area contained in an RUB of a Blu-ray disc-read only memory (BD-ROM) in accordance with the first embodiment of the present invention.

As shown in FIG. 7, the run-in area of the BD-ROM 200 in accordance with the first embodiment of the present invention can include the first guard area (Guard_1) and a preamble area (PrA). The preamble area can contain synchronous data consisting of 24-bit synchronous body data and 6-bit synchronous IDs. The synchronous data recorded in the preamble area of the BD-ROM 200 is different from that recorded in the preamble area of the BD-RE 100.

For example, the first synchronous data (Sync_1) having a synchronous ID of "000 100" and the second synchronous data (Sync_2) having a synchronous ID of "010 000" are sequentially recorded in the preamble area of the BD-RE 100, while the third synchronous data (Sync_3) having a synchronous ID of "000 001" and the second synchronous data (Sync_2) having a synchronous ID of "010 000" are sequentially recorded in the preamble area of the BD-ROM 200.

Figure 8:
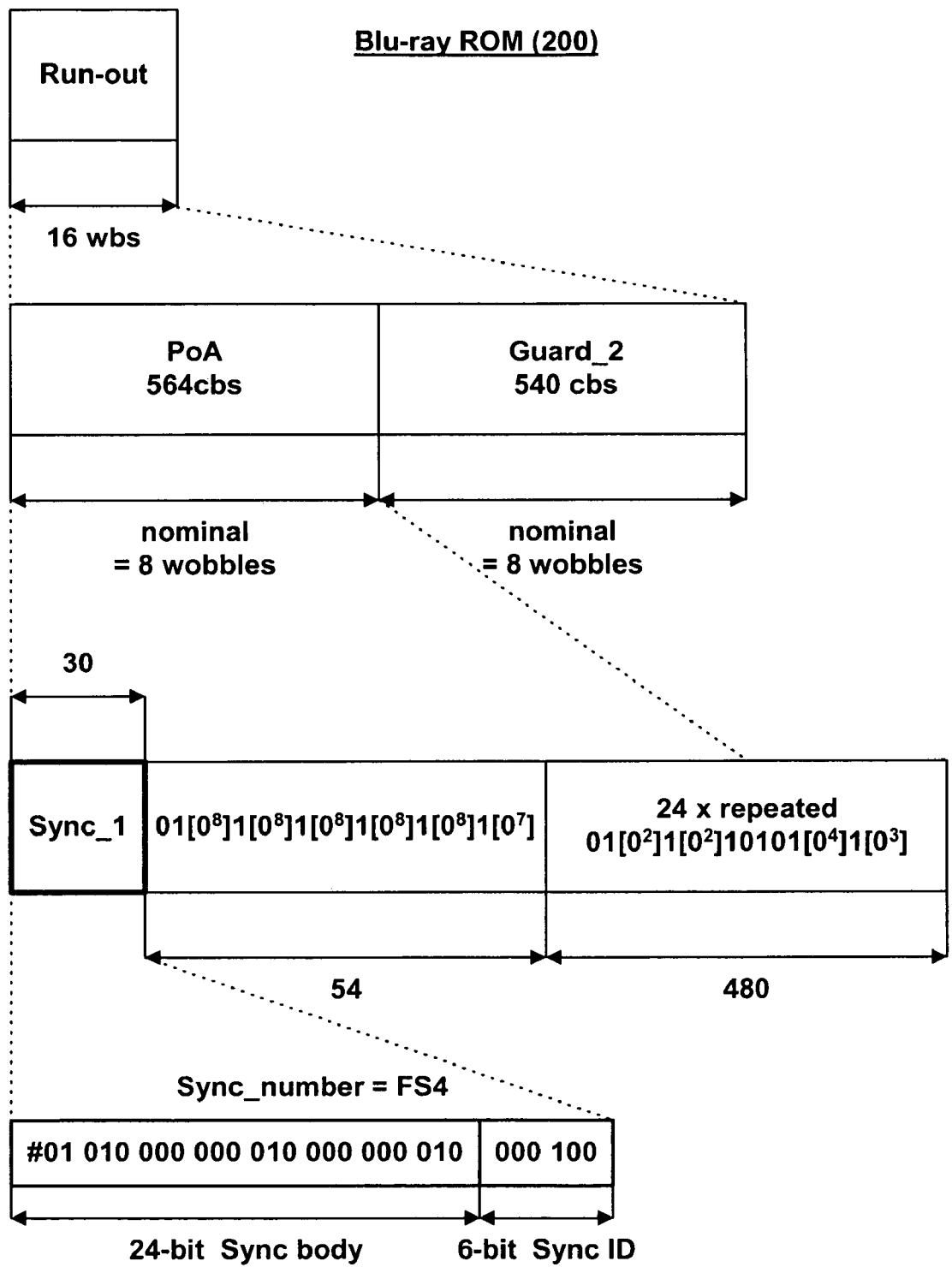
FIG. 8 is a view illustrating the configuration of a run-out area contained in the RUB of the BD-ROM in accordance with the first embodiment of the present invention.

Further, the third synchronous data (Sync_3) having a synchronous ID of "000 001" is recorded in the post-amble area contained in the run-out area of the BD-RE 100, while the first synchronous data (Sync_1) having a synchronous ID of "000 100" is recorded in the post-amble area contained in the run-out area of the BD-ROM 200 as shown in FIG. 8.

That is, the synchronous data recorded in the preamble or post-amble area of the BD-ROM 200 is different from that recorded in the preamble or post-amble area of the BD-RE 100.

Figure 9:
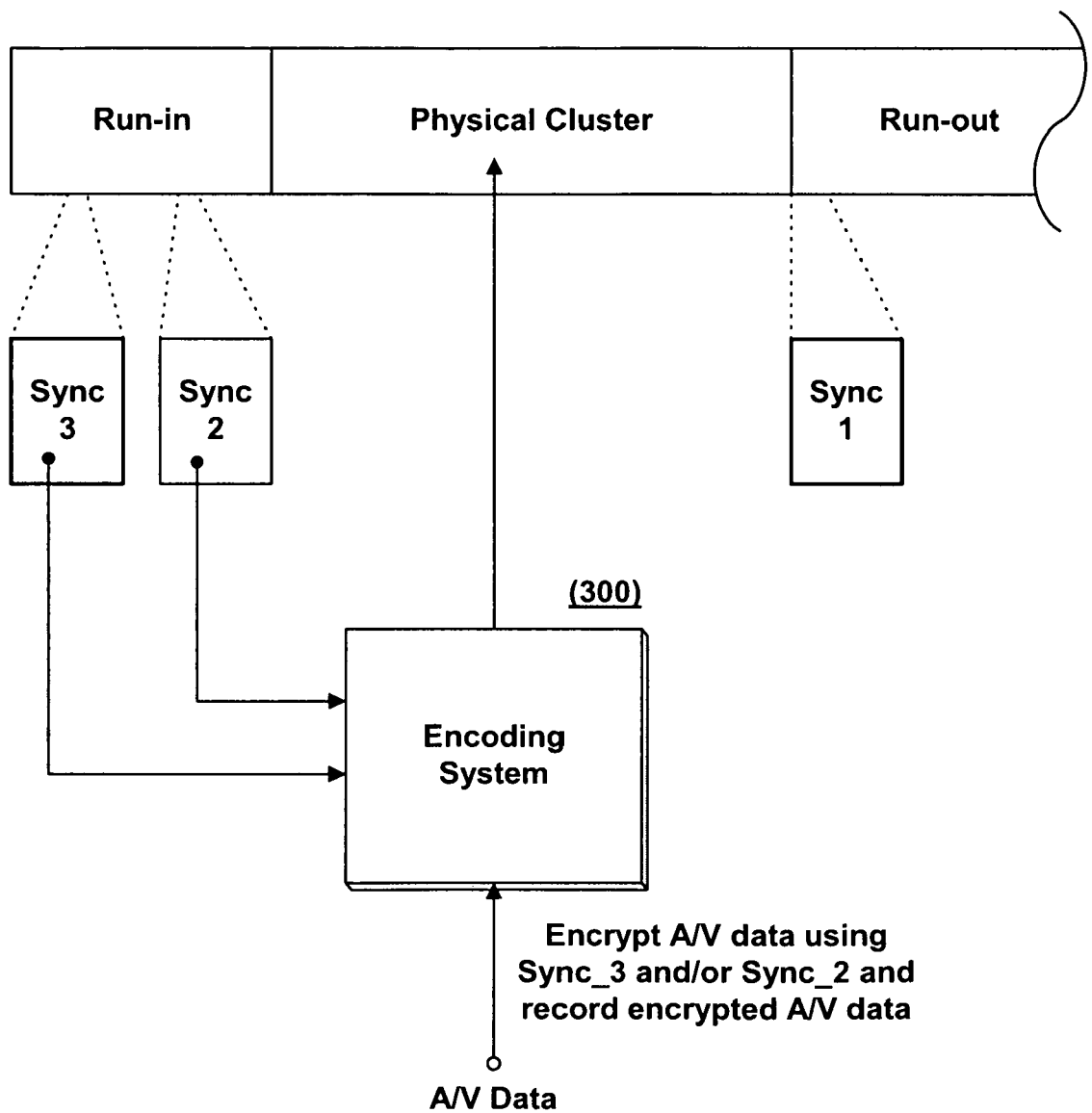
FIG. 9 is a view illustrating the relationship between an encoding system to which an encryption and recording method is applied, and the BD-ROM in accordance with the first embodiment of the present invention.

Encrypted A/V data for preventing unlawful copying can be recorded in the physical cluster area of the BD-ROM 200 containing the synchronous data different from the synchronous data of the BD-RE 100. For example, as shown in FIG. 9, an encoding system 300 recording encrypted data in a physical cluster area of the BD-ROM 200 encrypts A/V data using the third synchronous data or the second and third synchronous data and then records the encrypted A/V data in the physical cluster area.

In accordance with the second embodiment of the present invention, the physical cluster area contained in the RUB of the BD-ROM 200 includes address unit numbers (AUNs) linked to physical sector numbers and physical ADIP addresses. The AUNs recorded on the BD-ROM 200 are different from the AUNs recorded on the BD-RE 100.

For example, the AUNs recorded on the BD-RE 100 have values of "k~(k+n)", while the AUNs recorded on the BD-ROM 200 have values of "(k+m)~((k+n)+m)".

That is, the AUNs on the BD-ROM 200 can be recorded to have other values after shifting the values "k~(k+n)" of the AUNs on the BD-RE 100 by a predetermined value of "m". Further, the AUNs on the BD-ROM 200 can be recorded to have other values of "s~(s+n)" different from the values "k~(k+n)" of the AUNs on the BD-RE 100. As a result, the AUNs recorded in the physical cluster area of the BD-ROM 200 are different from the AUNs recorded in the physical cluster area of the BD-RE 100.

Figure 10:
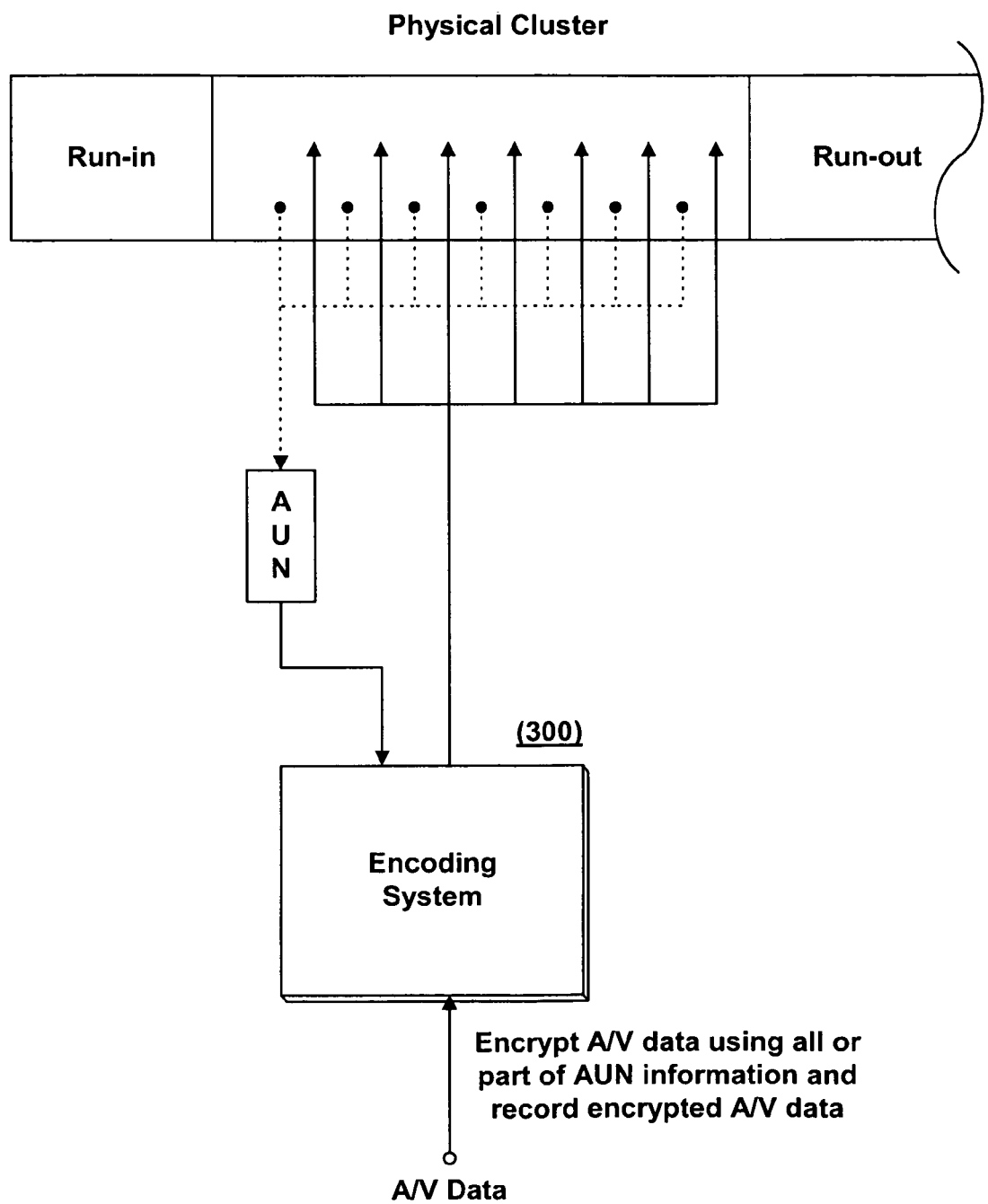
FIG. 10 is a view illustrating the relationship between an encoding system to which an encryption and recording method is applied, and the BD-ROM in accordance with the second embodiment of the present invention.

In the physical cluster area of the BD-ROM 200 containing the AUNs different from the AUNs recorded in the physical cluster area of the BD-RE 100, encrypted A/V data is recorded to prevent unauthorized or unlawful copying. For example, as shown in FIG. 10, the encoding system 300 recording the encrypted data in the physical cluster area of the BD-ROM 200 encrypts the A/V data using all or part of AUN information recorded in the physical cluster area, and then records the encrypted A/V data in the physical cluster area.

Figure 11:
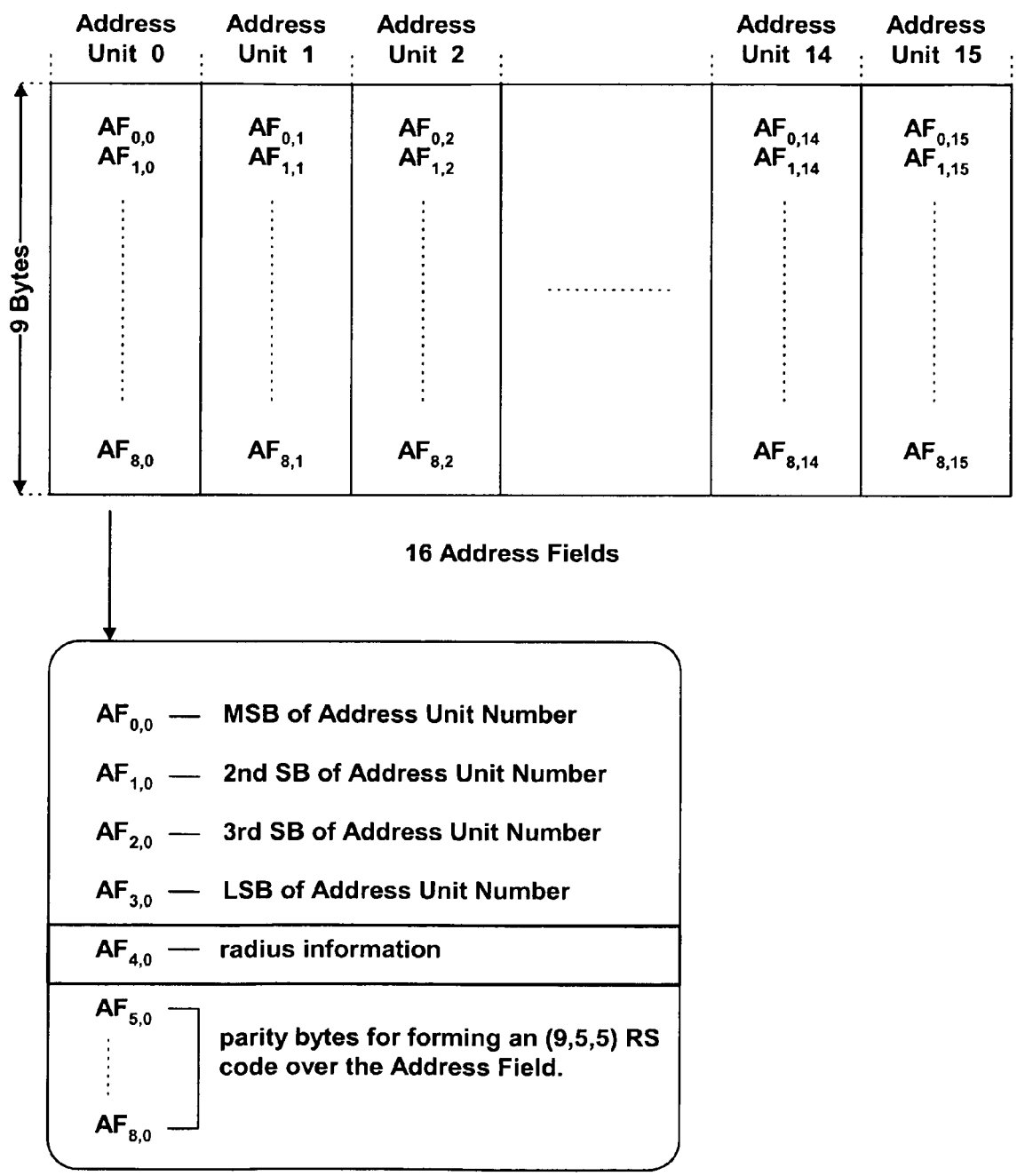
FIG. 11 is a view illustrating a state where disc radius information is recorded in an address unit (AU) in accordance with the third embodiment of the present invention.

In accordance with the third embodiment of the present invention, the AU recorded in the physical cluster area can contain disc radius information used for detecting a distance between a criterion of the inner periphery of the BD-ROM 200 and a corresponding position on the disc. For example, the disc radius information can be recorded by the $5^{th}$ byte of the AU as shown in FIG. 11.

Figure 12:
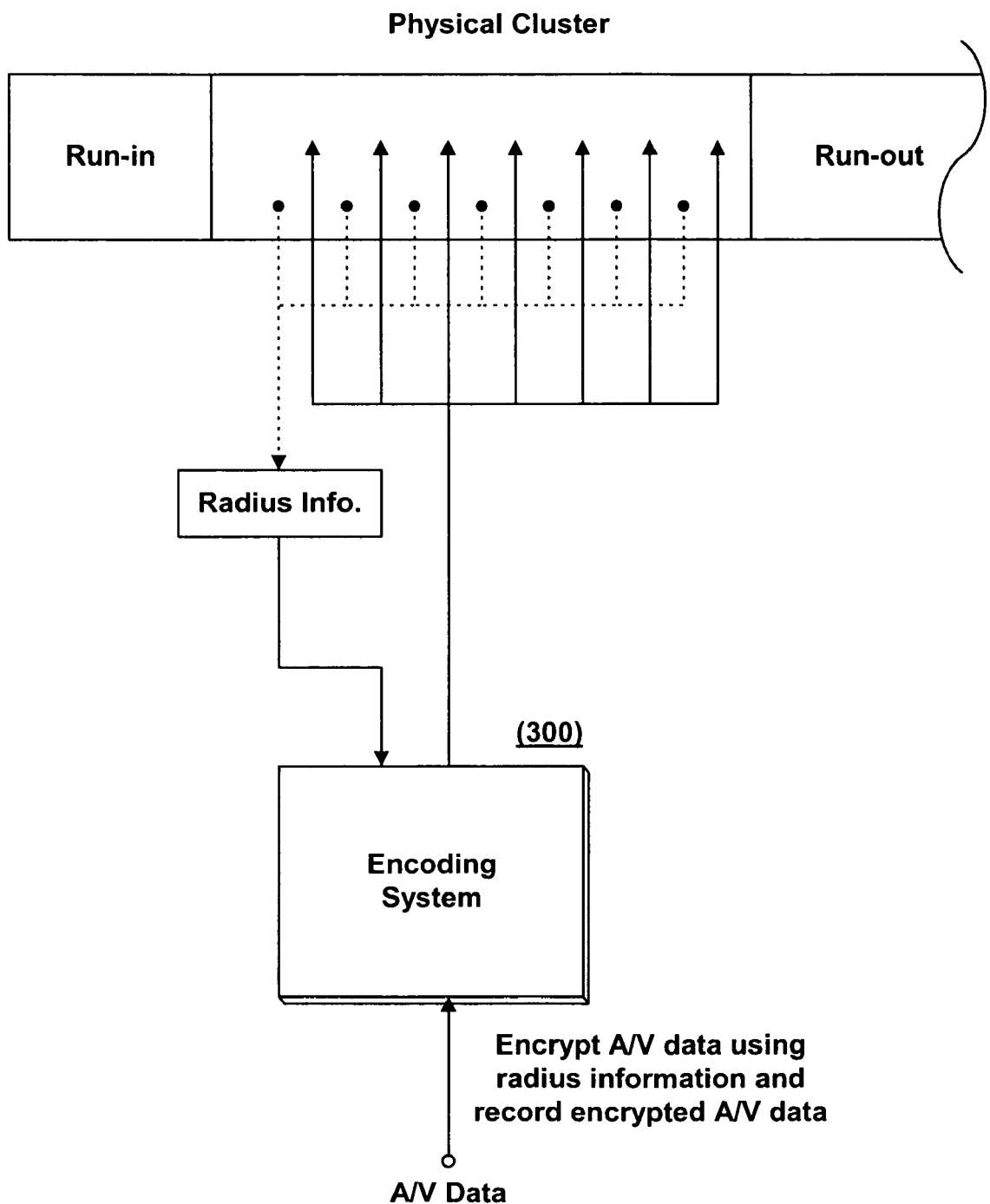
FIG. 12 is a view illustrating the relationship between an encoding system to which an encryption and recording method is applied, and the BD-ROM in accordance with the third embodiment of the present invention.

In the physical cluster area of the BD-ROM 200, encrypted A/V data is recorded to prevent unauthorized or unlawful copying. For example, as shown in FIG. 12, the encoding system 300 recording the encrypted data in the physical cluster area of the BD-ROM 200 encrypts the A/V data using the disc radius information recorded in the AU, and then records the encrypted A/V data in the physical cluster area.

For reference, the encoding system 300 can selectively use any conventional encryption processing method such as an encryption method, interleaving method, scrambling method, or etc.

The data is recorded in a discontinuous recording format on the BD-ROM as on the BD-RE. An optical disc apparatus such as a BD-ROM player maintains reproduction compatibility with the BD-RE. The optical disc apparatus performs an encryption and recording operation using each or at least two combination of the synchronous data, AUN and disc radius information, such that unauthorized or unlawful usage of the BD-ROM can be prevented.

Figure 13:
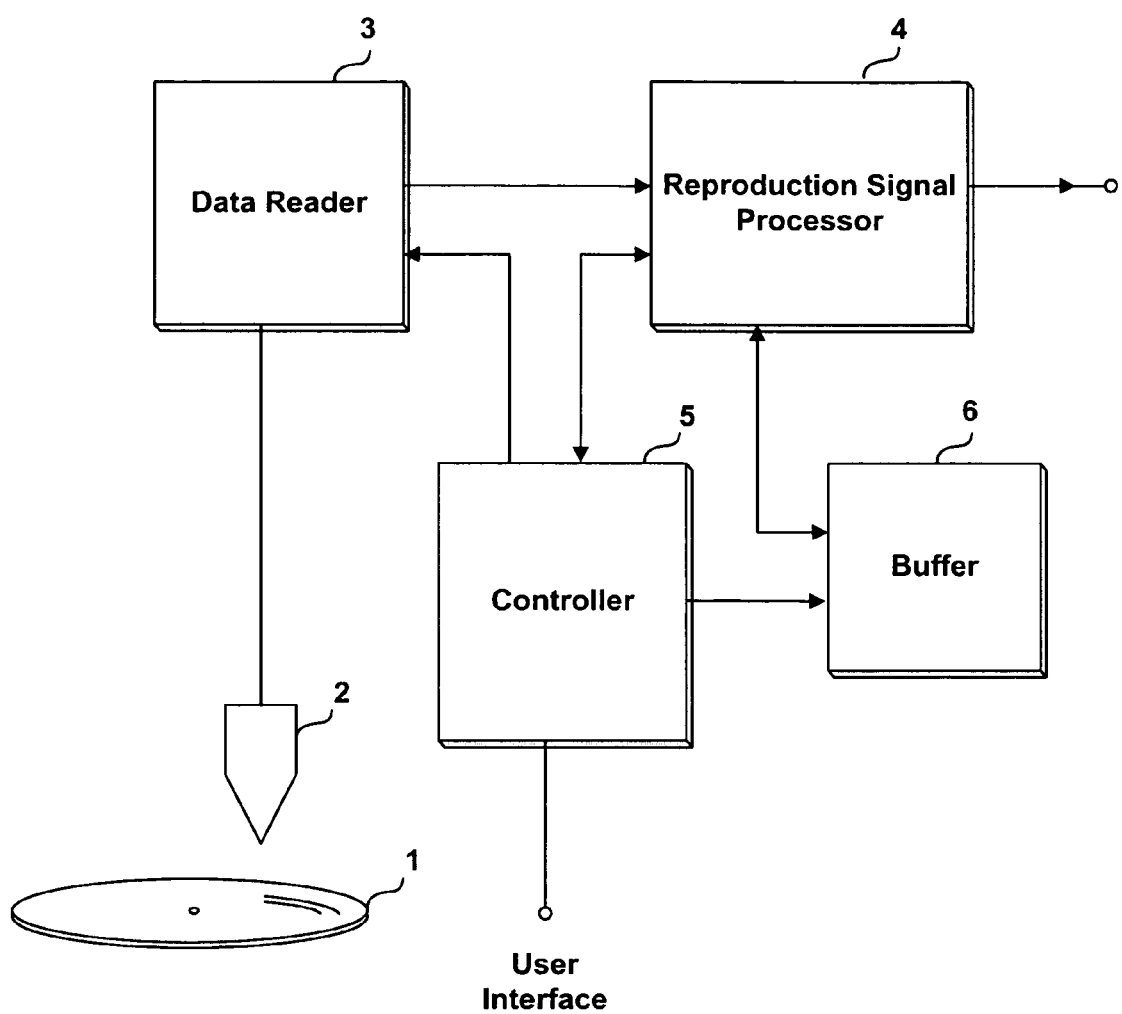
FIG. 13 is a view illustrating the configuration of an optical disc apparatus to which an encrypted data reproduction method is applied in accordance with an embodiment of the present invention.

FIG. 13 is a view illustrating the configuration of an optical disc apparatus to which an encrypted data reproduction method is applied in accordance with an embodiment of the present invention. An optical disc apparatus, e.g., a BD-ROM player, includes an optical pick-up 2 and data reader 3 for reading encrypted A/V data discontinuously recorded on a BD-ROM 1; and a reproduction signal processor 4 for decrypting the encrypted A/V data using synchronous data, disc radius information or AU numbers recorded on the BD-ROM 1, decoding the A/V data to original video and audio signals, and processing the video and audio signals to be reproduced.

The BD-ROM player further includes a controller 5 for controlling a reproduction signal processing operation; a buffer 6 for temporarily storing data needed for performing the reproduction signal processing operation, etc.

Figure 14:
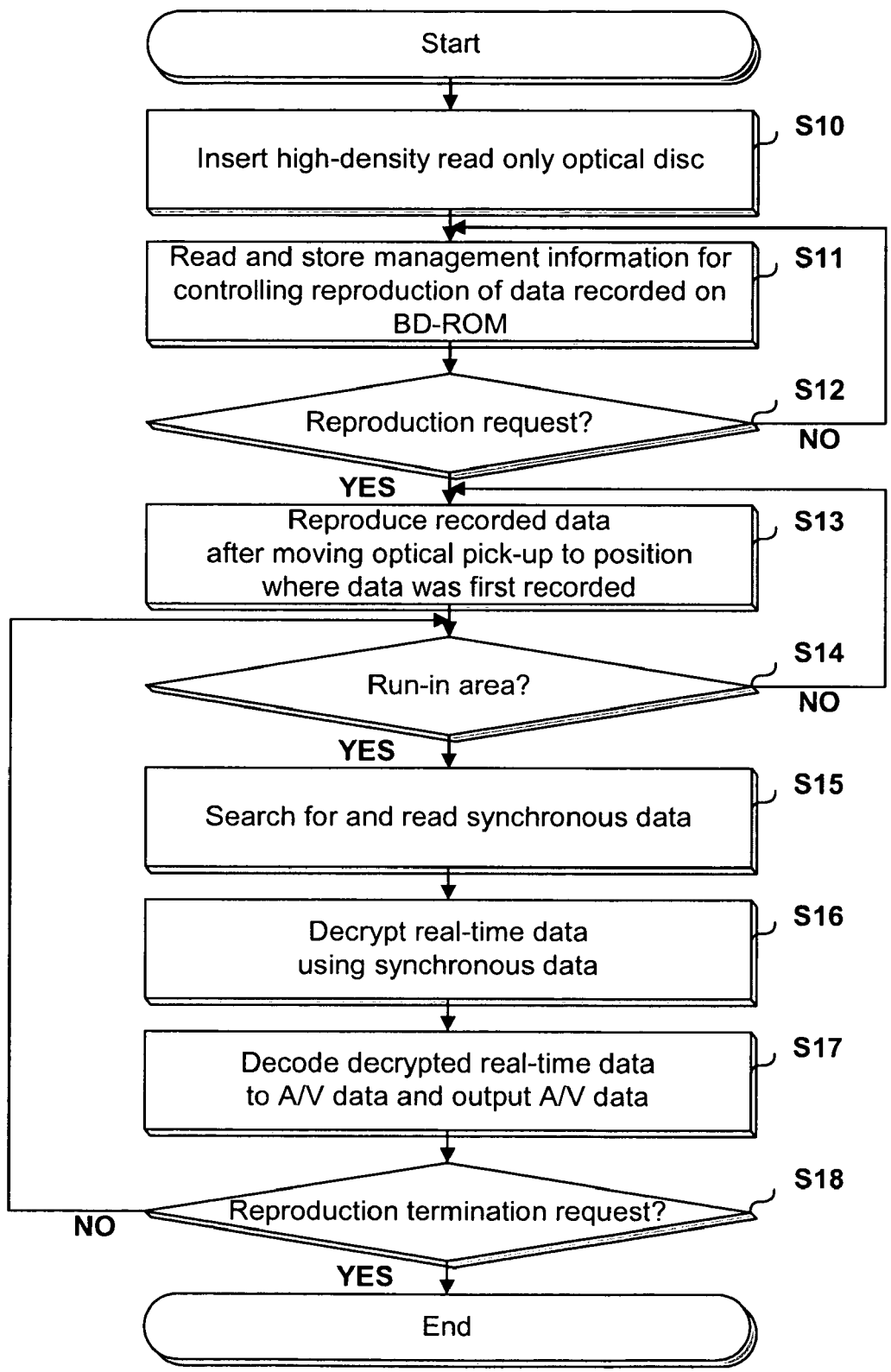
FIG. 14 is a flowchart illustrating the encrypted data reproduction method in accordance with the first embodiment of the present invention.

FIG. 14 is a flowchart illustrating the encrypted data reproduction method in accordance with the first embodiment of the present invention.

When the BD-ROM 1, on which encrypted A/V data is discontinuously recorded as shown in FIGS. 7 to 9, is inserted and loaded at step S10, the controller 5 searches for and confirms a lead-in area contained in the BD-ROM 1. The optical disc apparatus reads management information recorded in the lead-in area, i.e., management information for controlling the reproduction of data recorded on the BD-ROM 1, and then stores the read management information in an internal memory (not shown) at step S11.

When the reproduction operation is requested from the user at step S12, the controller 5 performs a sequence of reproduction operations for reading and reproducing the recorded data after moving the optical pick-up 2 to a position where real-time data such as A/V data was first recorded at step S13.

When the run-in area within the RUB shown in FIG. 7 is reproduced while the reproduction operation is performed, the controller 5 searches for and reads synchronous data recorded in the preamble (PrA) area of the run-in area, i.e., the third synchronous data (Sync_3) and/or the second synchronous data (Sync_2) different from the synchronous data recorded on the BD-RE at step S15.

Then, real-time data, i.e., A/V data encrypted and recorded in the physical cluster area subsequent to the run-in area, is decrypted to original A/V data using the read synchronous data at step S16. The decryption processing operation uses a decryption method corresponding to an encryption method, an interleaving method, a scrambling method, or etc. used in the above-described encryption processing operation.

At step S17, the controller 5 controls an operation of the reproduction signal processor 4 so that a sequence of reproduction signal processing operations for reproducing the decrypted A/V data to output original video and audio signals through an MPEG decoding operation can be appropriately performed. When a reproduction termination request is received according to the user's key input at step S18, the reproduction operation is terminated.

Figure 15:
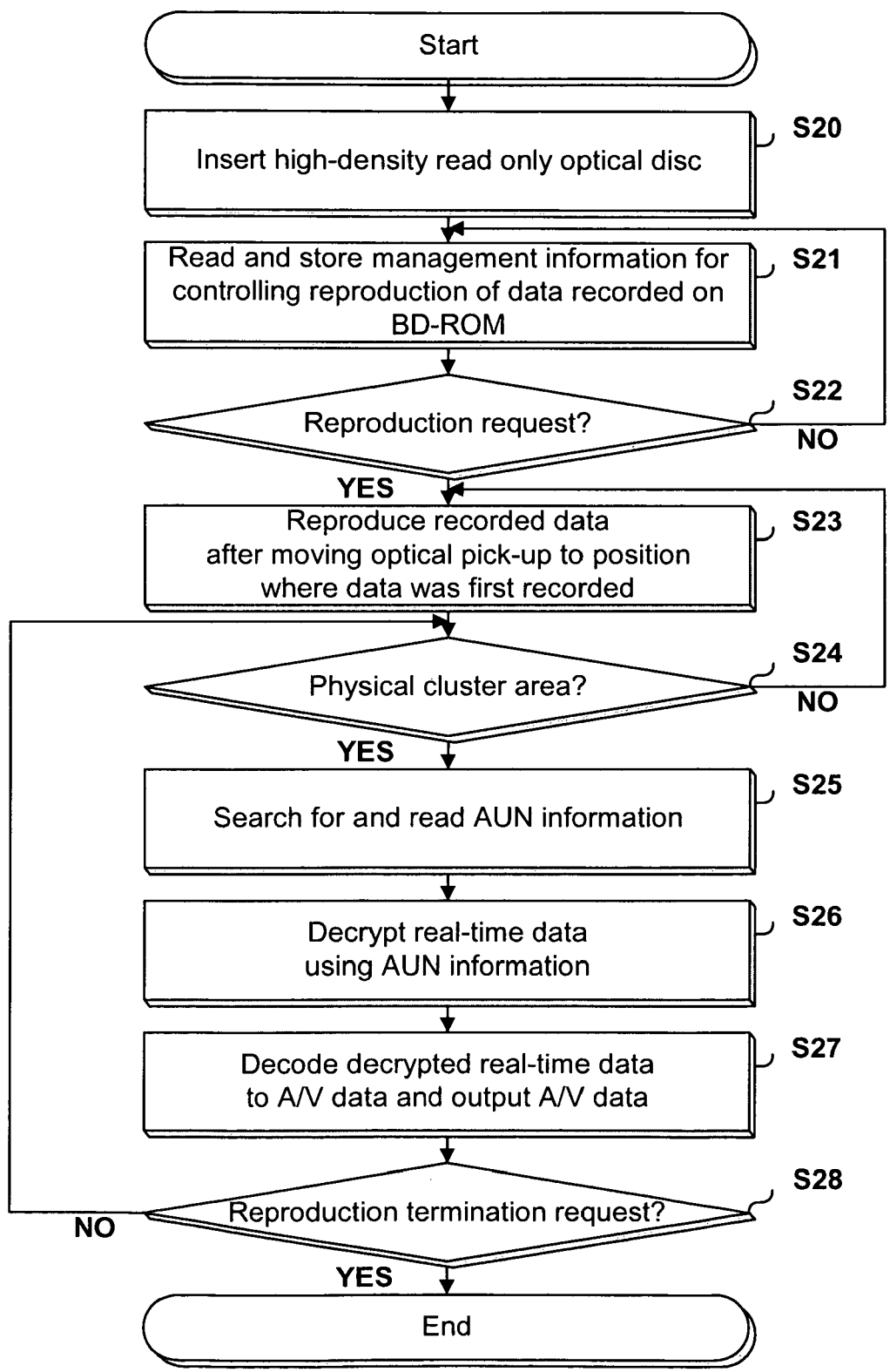
FIG. 15 is a flowchart illustrating the encrypted data reproduction method in accordance with the second embodiment of the present invention.

FIG. 15 is a flowchart illustrating the encrypted data reproduction method in accordance with the second embodiment of the present invention.

When the BD-ROM 1, on which encrypted A/V data is discontinuously recorded as shown in FIG. 10, is inserted and loaded at step S20, the controller 5 searches for and confirms a lead-in area contained in the BD-ROM 1. The optical disc apparatus reads management information recorded in the lead-in area, i.e., management information for controlling the reproduction of data recorded on the BD-ROM 1, and then stores the read management information in an internal memory (not shown) at step S21.

When the reproduction operation is requested from the user at step S22, the controller 5 performs a sequence of reproduction operations for reading and reproducing the recorded data after moving the optical pick-up 2 to a position where real-time data such as A/V data was first recorded at step S23.

When the physical cluster area within the RUB shown in FIG. 10 is reproduced while the reproduction operation is performed, the controller 5 searches for and reads AUN information recorded in an AU within the physical cluster area different from AUN information recorded on the BD-RE at step S25.

Then, real-time data, i.e., A/V data encrypted and recorded in the physical cluster area subsequent to the run-in area, is decrypted to original A/V data using all or part of the read AUN information at step S26. The decryption processing operation uses a decryption processing method corresponding to an encryption method, an interleaving method, a scrambling method, or etc. used in the above-described encryption processing operation.

At step S27, the controller 5 controls an operation of the reproduction signal processor 4 so that a sequence of reproduction signal processing operations for reproducing the decrypted A/V data to output original video and audio signals through an MPEG decoding operation can be appropriately performed. When a reproduction termination request is received according to the user's key input at step S28, the reproduction operation is terminated.

Figure 16:
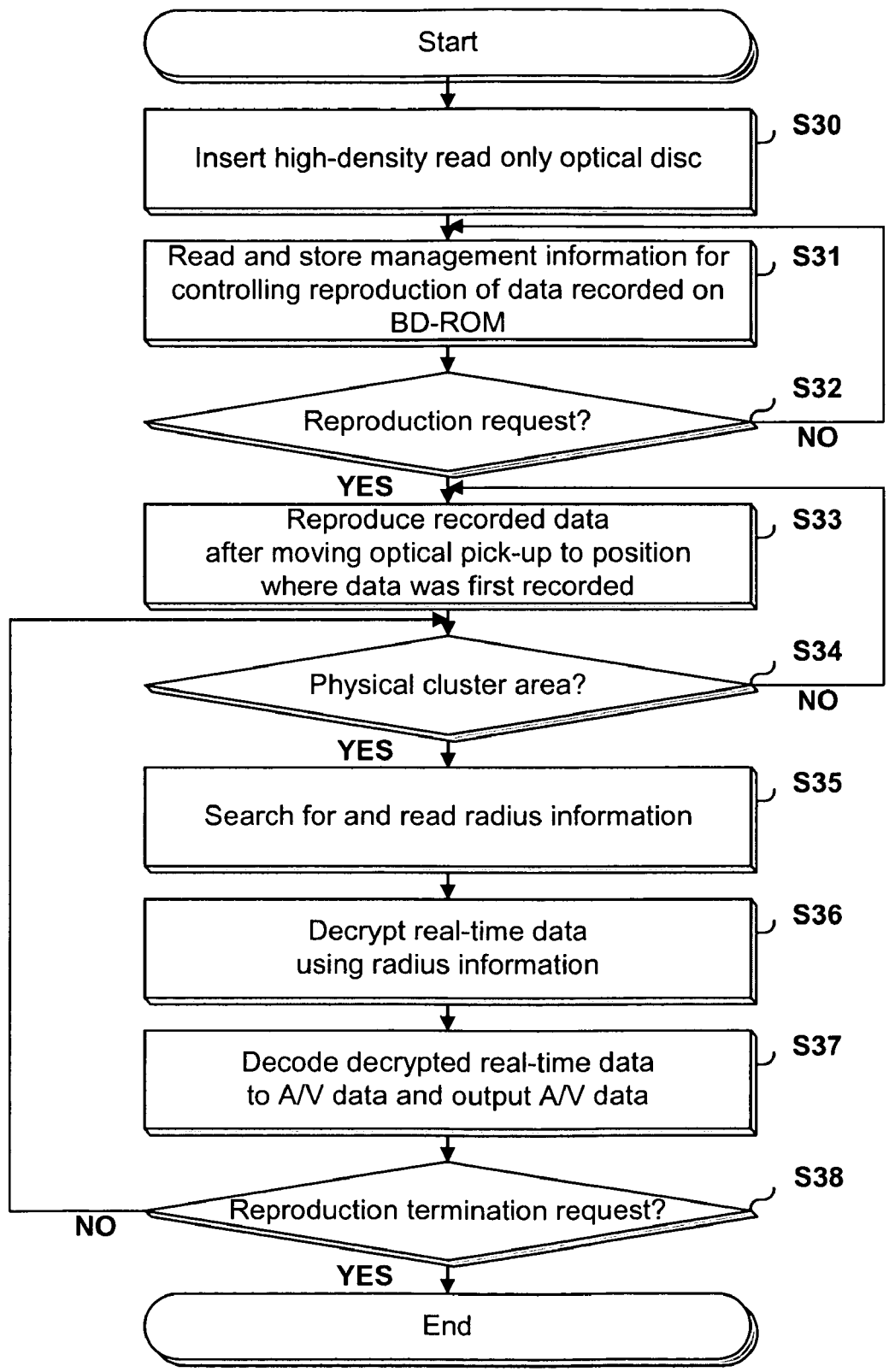
FIG. 16 is a flowchart illustrating the encrypted data reproduction method in accordance with the third embodiment of the present invention.

FIG. 16 is a flowchart illustrating the encrypted data reproduction method in accordance with the third embodiment of the present invention.

When the BD-ROM 1, on which encrypted A/V data is discontinuously recorded as shown in FIGS. 11 and 12, is inserted and loaded at step S30, the controller 5 searches for and confirms a lead-in area contained in the BD-ROM 1. The optical disc apparatus reads management information recorded in the lead-in area, i.e., management information for controlling the reproduction of data recorded on the BD-ROM 1, and then stores the read management information in an internal memory (not shown) at step S31.

When the reproduction operation is requested from the user at step S32, the controller 5 performs a sequence of reproduction operations for reading and reproducing the recorded data after moving the optical pick-up 2 to a position where real-time data such as A/V data was first recorded at step S33.

When the physical cluster area is reproduced while the reproduction operation is performed, the controller 5 searches for and reads disc radius information within an AU recorded in the physical cluster area at step S35.

Then, real-time data, i.e., A/V data is decrypted to original A/V data using the read disc radius information at step S36. The decryption processing operation uses a decryption method corresponding to an encryption method, an interleaving method, a scrambling method, or etc. used in the above-described encryption processing operation.

At step S37, the controller 5 controls an operation of the reproduction signal processor 4 so that a sequence of reproduction signal processing operations for reproducing the decrypted A/V data to output original video and audio signals through an MPEG decoding operation can be appropriately performed. When a reproduction termination request is received according to the user's key input at step S38, the reproduction operation is terminated.

The controller 5 searches for and reads the synchronous data, AUN information and disc radius information, and then can perform the decryption processing operation through at least two combinations of the read synchronous data, AUN information and disc radius information.

As described above, the encrypted data is decrypted using synchronous data recorded in the run-in area of the BD-ROM or using the radius information or AUN information recorded in the physical cluster area of the BD-ROM, and the decrypted data is reproduced and processed. Thus, a user holding the optical disc apparatus such as the BD-RE player can be prevented from unlawfully copying data of the BD-ROM to the BD-RE and unlawfully reproducing the copied data.

For reference, the above-described method for encrypting, decrypting data using the synchronous data, disc radius information or AUN information can be applied to the rewritable optical disc such as the BD-RE.

Further, in accordance with the embodiment of the present invention, the encryption and decryption processing operations for the BD-ROM can be performed on the basis of an arrangement sequence of the existing BD-RE without differentiating the arrangement of the synchronous data items or AUNs on the BD-ROM from that of the synchronous data items or AUNs on the BD-RE.

The preferred embodiments of the present invention have been disclosed for illustrative purposes. Those skilled in the art can readily understand that the present invention can be applied for other high-density optical discs as well as the BD-ROM. Further, those skilled in the art will appreciate that various modifications, additions and substitutions are possible, without departing from the scope and spirit of the invention as disclosed in the accompanying claims.

As apparent from the above description, the present invention provides a high-density optical disc, a method for encrypting data and recording the encrypted data thereon, and a method for reproducing the encrypted data recorded thereon, which can maintain reproduction compatibility with a high-density rewritable optical disc such as a BD-RE in an optical disc apparatus such as a BD-ROM player, and can prevent a user holding an optical disc apparatus such as a BD-RE recorder, etc. from unlawfully copying data recorded on the high-density optical disc and reproducing the copied data.

The invention claimed is:

1. A computer-readable read-only storage medium, wherein data is recorded in a data recording area according to a discontinuous recording format, the discontinuous recording format including a plurality of data blocks, each data block including a head portion, a main data portion and a tail portion, the main data portion preceded and followed by the head portion and the tail portion, wherein the head portion and the tail portion include a synchronous data, respectively, different from that of a head portion and a tail portion of discontinuous recording format in writable recording medium.

2. The storage medium of claim 1, wherein the main data portion comprises physical cluster.

3. The storage medium of claim 1, wherein the main data portion comprises encrypted A/V data portion.

4. The storage medium of claim 1, wherein the storage medium is a Blu-ray disc read-only (BD-RO).

5. The storage medium of claim 4, wherein the main data portion includes address unit number different from that of a high-density writable optical disc.

6. The storage medium of claim 5, wherein the address unit number has values k~(k+n) in the high-density writable optical disc while the address unit number has values (k+m)~((k+n)+m) in the BD-RO.

7. The storage medium of claim 5, wherein the address unit number has values k~(k+n) in the high-density writable optical disc while the address unit number has different values s~(s+n) in the BD-RO.

8. The storage medium of claim 4, wherein size of head portion and tail portion in BD-RO is equal to size of head portion and tail portion in a high-density writable disc, the head portion and the tail portion in the high-density writable optical disc comprising a run-in area and a run-out area respectively.

9. A method for reproducing data recorded on a read-only recording medium, comprising:
reading data recorded in a data recording area of the read-only recording medium according to a discontinuous recording format, the discontinuous recording format including a plurality of data blocks, the data block including a head portion, a main data portion and a tail portion, the main data portion preceded and followed by the head portion and the tail portion, wherein the head portion and the tail portion includes a synchronous data, respectively, different from that of a head portion and a tail portion of discontinuous recording format in writable recording medium; and
decoding the read main data portion to output original signal.

10. The method of claim 9, wherein the main data portion comprises physical cluster,
wherein the decoding step decodes the physical cluster of each data block.

11. The method of claim 9, wherein the main data portion comprises encrypted A/V data portion,
wherein the decoding step further includes a step of decrypting the encrypted A/V data portion of each data block.

12. The method of claim 9, wherein the storage medium is a Blu-ray disc read-only (BD-RO).

13. The method of claim 12, wherein the main data portion includes address unit number different from that of a high-density writable optical disc.

14. The method of claim 13, wherein the address unit number has values k~(k+n) in the high-density writable optical disc while the address unit number has values (k+m)~((k+n)+m) in the BD-RO,
wherein the decoding step uses the address unit number to decode the main data portion.

15. The method of claim 13, wherein the address unit number has values k~(k+n) in the high-density writable optical disc while the address unit number has different values s~(s+n) in the BD-RO,
wherein the decoding step uses the address unit number to decode the main data portion.

16. The method of claim 12, wherein size of head portion and tail portion in BD-RO is equal to size of head portion and tail portion in a high-density writable disc, the head portion and the tail portion in the high-density writable optical disc comprising a run-in area and a run-out area respectively,
wherein the decoding step decodes the main data portion except for the head portion and the tail portion.

17. An apparatus for reproducing data recorded on a read-only recording medium, comprising:
a reading unit for reading data recorded in a data recording area of the read-only recording medium according to a discontinuous recording format, the discontinuous recording format including a plurality of data blocks, the data block including a head portion, a main data portion and a tail portion, the main data portion preceded and followed by the head portion and the tail portion, wherein the head portion and the tail portion includes a synchronous data, respectively, different from that of a head portion and a tail portion of discontinuous recording format in writable recording medium;
a signal processor to decode the read main data portion to output original signal; and
a controller, coupled to the reading unit and the signal processor, to control the reproduction of the data.

18. The apparatus of claim 17, wherein the main data portion comprises physical cluster,
wherein the signal processor decodes the physical cluster of each data block.

19. The apparatus of claim 17, wherein the main data portion comprises encrypted A/V data portion,
wherein the signal processor decrypts the encrypted A/V data portion of each data block.

20. The apparatus of claim 17, wherein the storage medium is a Blu-ray disc read-only (BD-RO) and the main data portion includes address unit number different from that of a high-density writable optical disc,
wherein the signal processor uses the address unit number to decode the main data portion.

21. The apparatus of claim 20, wherein the address unit number has values k~(k+n) in the high-density writable optical disc while the address unit number has values (k+m)~((k+n)+m) in the BD-RO,
wherein the signal processor uses the address unit number to decode the main data portion.

22. The apparatus of claim 20, wherein the address unit number has values k~(k+n) in the high-density writable optical disc while the address unit number has different values s~(s+n) in the BD-RO,
wherein the signal processor uses the address unit number to decode the main data portion.

23. The apparatus of claim 17, wherein size of head portion and tail portion in BD-RO is equal to size of head portion and tail portion in a high-density writable disc, the head portion and the tail portion in the high-density writable optical disc comprising a run-in area and a run-out area respectively,
wherein the controller controls the signal processor to decode the main data portion except for the head portion and the tail portion.

24. The apparatus of claim 23, further comprising:
a buffer memory for storing the decoded main data portion of each data block.

* * * * *